(12) United States Patent
Symes et al.

(10) Patent No.: US 11,887,136 B1
(45) Date of Patent: Jan. 30, 2024

(54) SYSTEMS AND METHODS FOR PREDICTING INVESTMENT CAPITAL CROWDING IN A GEOGRAPHICAL AREA

(71) Applicant: BLACKROCK, INC., New York, NY (US)

(72) Inventors: Alexander Symes, New York, NY (US); Anita Mehrotra, Saratoga, CA (US); Melanie Manko, Winchester, MA (US); Patrick A. Ewane Essouman, Edgewater, NJ (US); Eric Warren Tawney, New York, NY (US); Shawn Simpson, New York, NY (US)

(73) Assignee: BLACKROCK, INC., New York, NY (US)

( * ) Notice: Subject to any disclaimer, the term of this patent is extended or adjusted under 35 U.S.C. 154(b) by 201 days.

(21) Appl. No.: 17/087,222

(22) Filed: Nov. 2, 2020

(51) Int. Cl.
*G06Q 30/0204* (2023.01)
*G06Q 50/16* (2012.01)
*G06N 20/00* (2019.01)
*G06Q 40/06* (2012.01)
*G06Q 50/08* (2012.01)

(52) U.S. Cl.
CPC ......... *G06Q 30/0205* (2013.01); *G06N 20/00* (2019.01); *G06Q 40/06* (2013.01); *G06Q 50/08* (2013.01); *G06Q 50/16* (2013.01)

(58) Field of Classification Search
None
See application file for complete search history.

(56) References Cited

U.S. PATENT DOCUMENTS

2016/0292800 A1* 10/2016 Smith ................. G06Q 50/16
2020/0034861 A1* 1/2020 Lundgren ............ G06N 20/00

* cited by examiner

*Primary Examiner* — Jason M. Borlinghaus
(74) *Attorney, Agent, or Firm* — Haynes and Boone LLP

(57) ABSTRACT

A decision-making tool for real estate properties consumes information about properties at a zip code level (including, but not limited to, transactions and construction), and outputs an indicator predicting whether capital is crowding into a specific region of the respective zip code in the next time period, e.g., next month, next quarter, etc. In this way, users can use the various deal flow data to better understand the likely patterns in capital flows in the real estate market for the upcoming quarter, and thus to inform decisions related to investing in real estate property or divesting existing properties.

18 Claims, 9 Drawing Sheets

SYSTEMS AND METHODS FOR PREDICTING INVESTMENT CAPITAL CROWDING IN A GEOGRAPHICAL AREA

TECHNICAL FIELD

The present application generally relates to data prediction models, and more specifically to using machine learning for predicting investment capital crowding in a geographical area.

BACKGROUND

Real estate investment has long been an important asset means in an investment portfolio for investors. Traditionally, real estate investment has primarily been devised based on market fundamentals, such as the average real estate price, or the sale price in recently closed transaction in the geographical area that a particular property belongs to. However, investment decision driven only by the current market price can often be volatile, lacking the long-term vision on the robustness of the real estate performance of the geographical area. The "industry-standard" methods in real estate research can often be insufficient for effectively evaluating viable properties for investing in or divesting from. Such methods utilize rigid frameworks to identify which submarkets to invest in. Moreover, available data is opaque, highly aggregated, and excludes counterfactual data.

Therefore, there is a need for an analytics mechanism that informs decisions related to investing in real estate property or divesting existing properties based on the long-term projection of real estate performance.

SUMMARY

In view of the need for an analytics mechanism that inform decisions related to investing in real estate property, a method for predicting capital crowding of transaction events in a geographical area is provided. One or more event records may be received, from one or more databases each storing a respective plurality of event records. It is then determined, from the one or more event records, a total count of events of a specific type corresponding to at least a specific zip code and a specific property type that occurred during a past period of time. A transaction feature input is generated corresponding to each property type and each zip code based on a growth trend of a total count of events of a transaction type corresponding to the zip code and the specific property type. A construction feature input is generated corresponding to each property type and each zip code based on a growth trend of a total count of events of a construction type corresponding to the zip code and the specific property type. The transaction feature input and the construction feature input are combined into a combined feature input vector corresponding to the zip code and the specific property type. A prediction model is then trained or accessed based at least in part on a plurality of combined feature input vectors corresponding to a plurality of combinations of zip codes, a past time period and a property type. A predicted event score corresponding to a target property type and a target zip code for a subsequent period of time is thus generated based on the trained prediction model.

In one implementation, each event record from the one or more event records includes data fields indicating any combination of: an event type; an event date; an event location; and a property type that is transacted or constructed during an event of the respective event record.

In one implementation, the total count of events of the specific type is determined by determining, from the one or more event records, the total count of transactions corresponding to the specific zip code and a specific property type that occurred during a past period of time for all events that are transactions, or determining, from the one or more event records, the total count of constructions corresponding to the specific zip code and the specific property type that started during the past period of time for all events that are constructions.

In one implementation, the transaction feature input is generated by: assigning a positive label to a transaction event corresponding to the respective property type and the respective zip code when a respective rate of change in total transaction number during the period of time belongs to a first percentile among a geographical area; assigning a negative label to the transaction event when the respective rate of change during the period of time belongs to a second percentile among the geographical area; and concatenating all positive labels and all negative labels corresponding to the respective property type and the respective zip code to form a binary input vector.

In one implementation, the construction feature input is generated by: assigning a positive label to a construction start event corresponding to the respective property type and the respective zip code when a respective rate of change in total construction start event number during the period of time belongs to a first percentile among a geographical area; assigning a negative label to the construction start event when the respective rate of change during the period of time belongs to a second percentile among the geographical area; and concatenating all positive labels and all negative labels corresponding to the respective property type and the respective zip code to form a binary input vector.

In one implementation, the combined feature input vector is generated by: assigning a positive label to a combination of a specific zip code, the period of time and a specific property type when (i) a corresponding rate of change in cumulative transactions is positive based on the transaction feature input and (ii) no construction start event occurred corresponding to the combination based on the construction feature input; determining whether a respective total count of transactions or a respective total count of construction start events corresponding to the combination that has been assigned the positive label is greater than a pre-defined threshold; and changing the positive label to a negative label for the combination when the respective total count of transactions or the respective total count of construction start events corresponding to the combination that has been assigned the positive label is less than the pre-defined threshold.

In one implementation, the prediction model is a logistic regression model that identifies a relationship between a capital crowding metric and historical transaction or construction data.

In one implementation, the prediction model is a binary classifier model that generates a binary output indicating whether a capital crowding occurrence happens during the subsequent period of time.

In one implementation, the predicted event score is generated by the prediction model given an input of one or more new event records that are not included in the one or more event records, and the input of one or more new event records are input to the prediction model in a form of a feature input vector.

In one implementation, the one or more event records are balanced by applying to different classes of data in the one or more event records weights that are inversely proportional to a frequency of a corresponding class of data.

Figure 1:
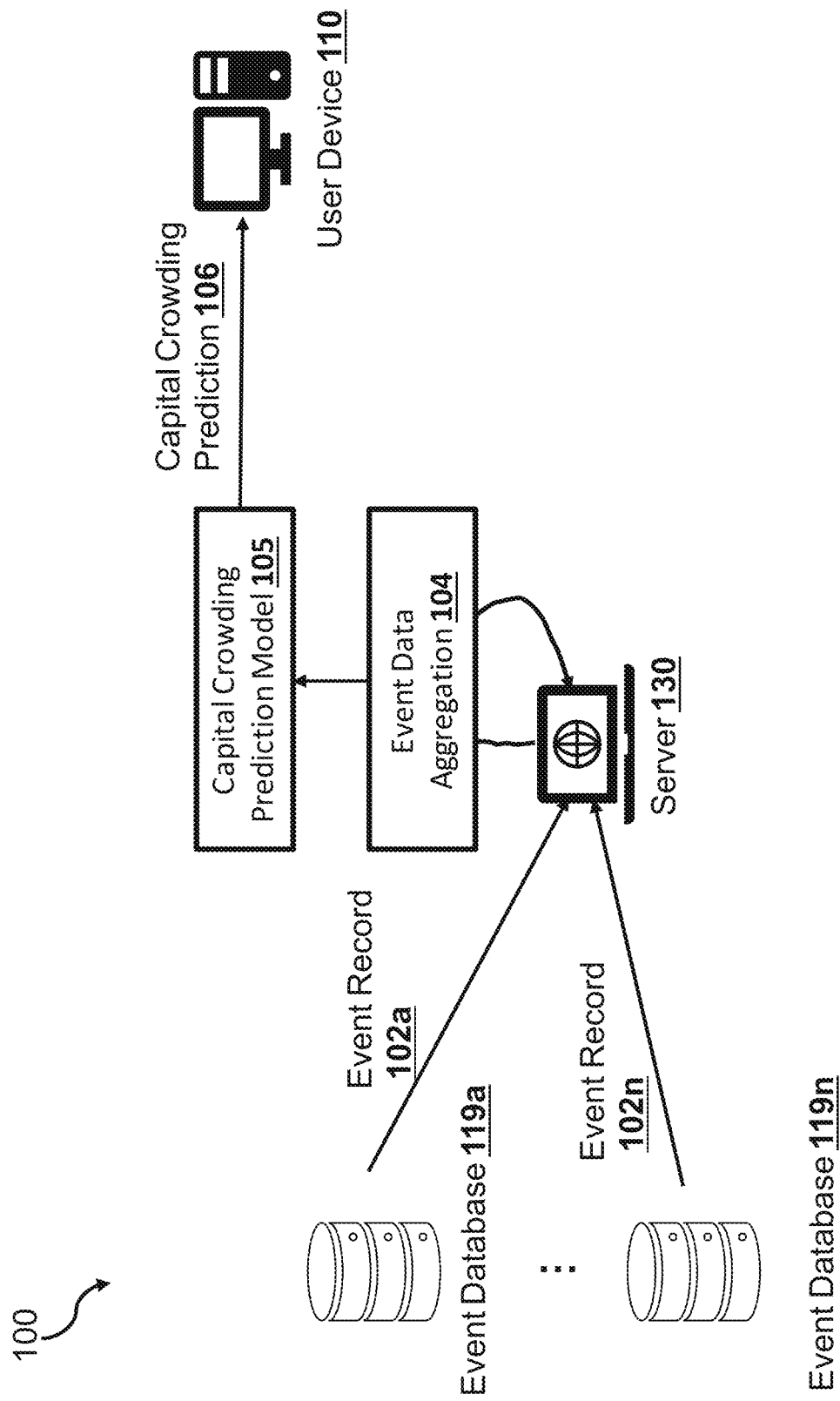
FIG. 1 provides a block diagram illustrating an example aspect of capital crowding prediction based on historical event data from various data sources, according to embodiments described herein.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods, systems and apparatuses utilized for predicting investment capital crowding, and in particular real estate capital crowding in a geographical area to assist investment decision in real estate investment using machine learning models. Systems suitable for practicing methods of the present disclosure are also provided.

As used herein, the term "capital crowding" refers to concentration of capital flows into a geographical area during a period of time. For example, a number of real estate transactions and/or construction starts that occurred in the same quarter at a zip code may constitute real estate capital crowding in the zip code.

Traditionally, real estate investment has primarily been devised based on market fundamentals, such as the average real estate price, or the sale price in recently closed transactions in the geographical area that a particular property belongs to. Such market-only approaches for real estate investment may lack the long-term vision on the robustness of the real estate performance of the geographical area.

On the other hand, financial institutions, such as BlackRock®, Inc., possess rich data on capital flows. For example, recent research showed that the risk in real estate investments existed in the transaction itself. It therefore followed that if a party in the transaction could improve its ability to "transact," the party would be better positioned to obtain outsized returns. Separately, capital markets play the largest role in improving investors' ability to transact. These observations of data points and relationships between completed transactions and the start of construction are indicative of market trends in the real estate market but have been largely under-utilized.

Thus, in view of the need to utilize capital flow information to better understand and deploy resources to evaluate the pipeline of real estate deals, embodiments described herein use granular transaction data and construction data to track and predict movements in capital flows in a geographical area, e.g., per zip code, etc. Specifically, a decision-making tool for real estate properties consumes information about properties at a zip code level (including, but not limited to, transactions and construction), and outputs an indicator predicting whether capital is crowding or being put into a specific region of the respective zip code in the next time period, e.g., next month, next quarter, etc. The decision-making tool, which may include a machine learning engine (e.g., a regression engine, etc.), allows for data experiments with classification of those flows at varying levels of geographic granularity, allowing users (e.g., investors, analysts, etc.) to drill down to the zip code level. In this way, users can use the various deal flow data to better understand the likely patterns in capital flows in the real estate market for the upcoming quarter, and thus to inform decisions related to investing in real estate property or divesting existing properties.

FIG. 1 provides a block diagram 100 illustrating an example aspect of capital crowding prediction based on historical event data from various data sources, according to embodiments described herein. Diagram 100 shows a server 130, various databases 119*a-n*, a user device 110, and/or the like interacting with each other, e.g., via a communication network. In diagram 100, event databases 119*a-n* are shown for illustrative purposes, while any number of databases may be communicative with the server 130. Each of event databases 110*a-n* may store a number of event records. For example, each event record 102*a-n* may be a record of a real estate transaction event such as a sales or a purchase, or a real estate construction start event.

In one embodiment, the server 130 may receive various event records 102*a-n* from the databases 119*a-n*. In one implementation, each event record 102*a-n* may include data fields such as, but not limited to event type (e.g., transaction or construction start, etc.), event time, involved party, property type, property details, capital value (e.g., transaction price or an estimated value for the construction, etc.), zip code, address, and/or the like. For example, the event record 102*a* may be a transaction record: event type={"sale"}, event time="3 Aug. 2019," property type={"commercial," "office,"}, property details={"30,000 sf," "multitenant," "single building," "elevator," "built 1990," etc.}, capital value={"55,000,000.00"}, zip code={"94301"}, etc.

In some implementations, the event records 102*a-n* may be sent to the server 130 periodically in a batch, e.g., monthly, quarterly, and/or the like. In another implementation, the server 130 may request updates from event database 119*a-n* on demand, or in an ad hoc manner.

In one embodiment, the server 130 may input all the data from the event records 119*a-n* to an event data aggregation module 104. For example, the event data aggregation module 104 may convert the discrete events from the event records 102*a-n* to capital crowding data indicating whether a concentration of transactions or construction events have occurred during a past period of time (e.g., last quarter, last year, etc.) at the zip code level. Specifically, the capital crowding data may take a form as an input vector.

The capital crowding input vectors generated by the event data aggregation module 104 may be sent to the capital crowding prediction model 105, which may in turn establish a relationship between historical transaction or construction data and a capital crowding metric, e.g., the probability of capital crowding at current time. The established relationship may in turn be used to generate a capital crowding prediction 106 for a future period of time, e.g., next month, next quarter, etc., based on the transaction and/or construction data of the current time. Further details of the capital crowding prediction model 105 are described in relation to FIG. 3.

The capital crowding prediction 106 may then be provided to a user device 110, e.g., in the form of an electronic mail, a system message, an instant message, a cloud file transfer, and/or the like, etc. The capital crowding prediction 106 may then assist in decision making as to whether to invest in or divest from real estate properties at a certain zip code.

Figure 2:
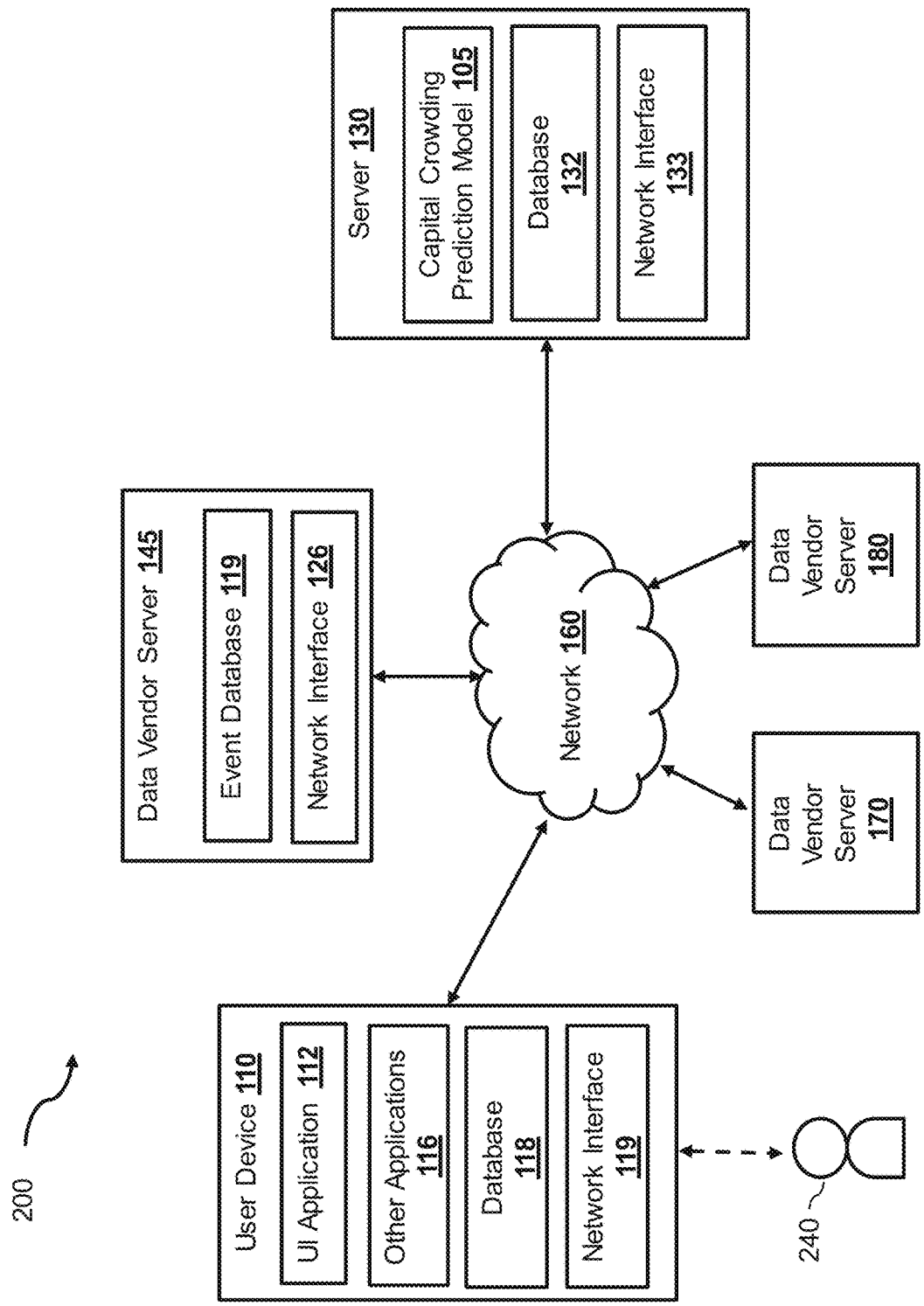
FIG. 2 is a block diagram of a networked system suitable for implementing the processes described in FIG. 1 and other embodiments described herein, according to an embodiment.

FIG. 2 is a block diagram 200 of a networked system suitable for implementing the processes described in FIG. 1 and other embodiments described herein, according to an embodiment. In one embodiment, block diagram 200 shows a system including the user device 110 which may be operated by a user 240, data vendor servers 145, 170 and 180, server 130, and other forms of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 110, data vendor servers 145, 170 and 180, and the server 130 may communicate with each other over a network 160. User device 110 may be utilized by user 240 to access the various features available for user device 110, which may include processes and/or applications associated with the server 130 to receive an output of capital crowding prediction (e.g., 106 in FIG. 1).

User device 110, data vendor server 145, and the server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 160.

User device 110 may be implemented as a communication device that may utilize appropriate hardware and software configured for wired and/or wireless communication with data vendor server 145 and/or the server 130. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 110 of FIG. 2 contains a user interface (UI) application 112, and/or other applications 116, which may correspond to executable processes, procedures, and/or applications with associated hardware. For example, the user device 110 may receive an electronic message containing the capital crowding prediction 106 from the server 130 and display the electronic message via the UI application 112. In other embodiments, user device 110 may include additional or different modules having specialized hardware and/or software as required.

In various embodiments, user device 110 includes other applications 116 as may be desired in particular embodiments to provide features to user device 110. For example, other applications 116 may include security applications for implementing client-side security features, programmatic client applications for interfacing with appropriate application programming interfaces (APIs) over network 160, or other types of applications. Other applications 116 may also include communication applications, such as email, texting, voice, social networking, and IM applications that allow a user to send and receive emails, calls, texts, and other notifications through network 160. For example, the other application 116 may be an email or instant messaging application that receives a data anomaly message from the server 130. Other applications 116 may include device interfaces and other display modules that may receive input and/or output information. For example, other applications 116 may contain software programs, executable by a processor, including a graphical user interface (GUI) configured to provide an interface to the user.

User device 110 may further include a database 118 stored in a transitory and/or non-transitory memory of user device 110, which may store various applications and data and be utilized during execution of various modules of user device 110. Database 118 may store received capital crowding prediction 106, market data, inflation data, and/or the like. In some embodiments, database 118 may be local to user device 110. However, in other embodiments, database 118 may be external to user device 110 and accessible by user device 110, including cloud storage systems and/or databases that are accessible over network 160.

User device 110 includes at least one network interface component 119 adapted to communicate with data vendor server 145 and/or the server 130. In various embodiments, network interface component 119 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 145 may correspond to a server that hosts the event database 119 (e.g., similar to any of event databases 119*a-n*) to provide data records to the server 130. For example, the event database 119 may be similar to any of the event databases 119*a-n* storing event data relating to a real estate transaction, or a construction start. The event database 119 may be implemented by one or more relational database, distributed databases, cloud databases, and/or the like.

The data vendor server 145 includes at least one network interface component 126 adapted to communicate with user device 110 and/or the server 130. In various embodiments, network interface component 126 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 145 may send data records retrieved from a database 119, via the network interface 126, to the server 130.

The server 130 may be housed with a capital crowding prediction model 105. In some implementations, the capital crowding prediction model 105 may be a neural network model, a regression model, and/or the like, which is based on hardware, software or a combination thereof. For example, the capital crowding prediction model 105 may receive event data from the event database 119 in the data vendor server 145 via the network 160.

A database 132 may be stored in a transitory and/or non-transitory memory of the server 130. In various embodiments, for example, the database 132 may be an event data aggregation database storing aggregated event data in the form of input capital crowding vectors, e.g., generated from the event data aggregation module 104. In one implementation, the database 132 may store data records obtained from the data vendor server 145. In some embodiments, database 132 may be local to the server 130. However, in other embodiments, database 132 may be external to the server 130 and accessible by the server 130, including cloud storage systems and/or databases that are accessible over network 160.

The server 130 includes at least one network interface component 133 adapted to communicate with user device 110 and/or data vendor servers 145, 170 or 180 over network 160. In various embodiments, network interface component 133 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 200.

Figure 3:
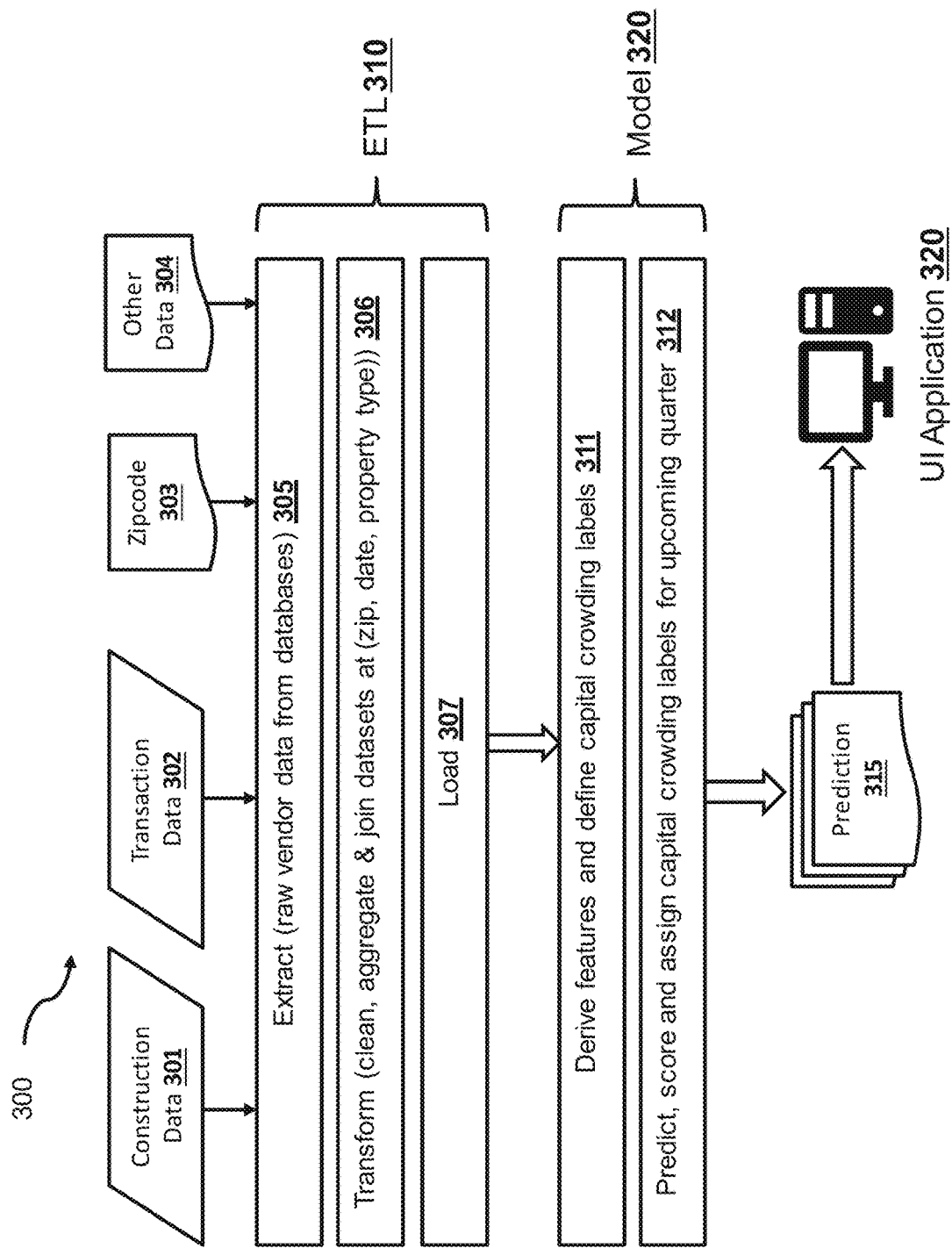
FIG. 3 illustrates a simplified diagram illustrating an architecture of the capital crowding prediction system implemented at the server, according to one embodiment described herein.

FIG. 3 illustrates a simplified diagram 300 illustrating an architecture of the capital crowding prediction system implemented at the server 130, according to one embodiment described herein. Diagram 300 shows that a variety of data inputs, such as construction data 301, transaction 302, zipcode information 303, and/or other data 304 may be input to an Extraction, Transformation, and Load (ETL) processing 310 of the system.

For example, data 301-304 may be obtained from various databases provided by various data vendor servers 145, 170, 180 as shown in FIG. 2. Construction data 301 may be an example of event records 102a-n, which includes the construction start date, projected construction completion date, property type, estimated property value, zip code, address, property details, and/or the like. Transaction data 302 may be another example of event records 102a-n, which includes the transaction date, transaction price, property type, property details, zip code, address, and/or the like. Zipcode data 303 may include the zip codes, and a zip code to a geographical area such as the metropolitan statistical area (MSA) mapping data. Other data 304 from various external databases may further include capital markets data (e.g., deal flow information, etc.), macroeconomic factor data, inflation factor data, climate data (of the geographical area), and/or the like. For example, the various data input locations from the external databases may be obtained via MS SQL, and/or the like.

Data 301-304 may then be provided to ETL processing 310, which may in turn orchestrate the raw data 301-304 for a model component 320, e.g., via sci-kit learn, Luigi, etc. In some implementations, the ETL processing 301 may use BitBucket for version control of the various data 301-304.

An extract process 305 of ETL processing 310 may extract construction or transaction information, zip code to MSA mapping data from raw vendor data (e.g., from the data vendor servers 145, 170, 180).

A transform process 306 of the ETL processing 310 may then transform the extracted raw data into an input vector form. For example, the raw vendor data may take a form of an unstructured text, an excel spreadsheet, and/or the like. The extract process 305 may clean (e.g., handle NaN values, drop irrelevant columns, etc.), and aggregate the cleaned data attributes at each combination of (zip code, date, property type) level into an input vector form. In some implementations, the extract process 305 may process subsets of columns from the raw data and derive additional features and join all data sets from different sources by the combination of (zip code, date, property type) for aggregating the event data.

For example, for a number of transaction records from transaction data 301, the number of transactions that occurred in each quarter, property type and zip code may be counted. Similarly, for a number of construction projects from construction data 302, the number of construction projects that have broken ground ("construction starts") within each quarter, property type and zip code may be counted. The aggregated transaction or construction number may provide insights on the capital crowding or funding during the quarter at the specific zip code. Further details of aggregating the cleaned data attributes may be described in relation to FIGS. 6-7.

A load process 307 of the ETL processing 310 may then load the aggregated data representing the transaction/construction data of a quarter into a memory, e.g., database 132 at server 130.

The model component 320 of the system may be implemented through hardware, software, or a combination thereof, which may execute the capital crowding prediction model 105 shown in FIGS. 1-2. The model component 320 may derive features from the aggregated transaction or construction data loaded from the memory, and define capital crowding labels at process 311. For example, a binary vector may be generated, in which each binary entry "1" indicates a capital crowding period for a specific combination of (zip code, quarter, property type), and each binary entry "0" indicates a non-capital crowding period for the specific combination. The generation of the binary vector is further described in relation to FIGS. 6-7

The model component 320 may then use the binary vectors to train the capital crowding prediction model 105. For example, the capital crowding prediction model 105 may be a logistic regression model, and the model component 320 defines coefficients for the logistic regression model based on a relationship between the input of binary vectors that belong to a past quarter and the capital crowding labels of a current time. For another example, the capital crowding prediction model 105 may be a binary classification model, which may be updated based on a loss comparing the predicted capital crowding labels based on the binary vectors that belong to the past quarter and the ground truth labels from the current time. Further details of deriving the capital crowding prediction model 105 may be further provided in relation to FIG. 6.

The model component 320 may then predict, score and assign a capital crowding label for a specific combination of (zipcode, property type, next quarter) for the upcoming quarter at process 312. A generated prediction 315 (e.g., similar to 106 in FIG. 1) may be provided to a data output location via MS SQL, or may be provided for visualization via a UI application 320, e.g., Tableau, etc.

Figure 4:
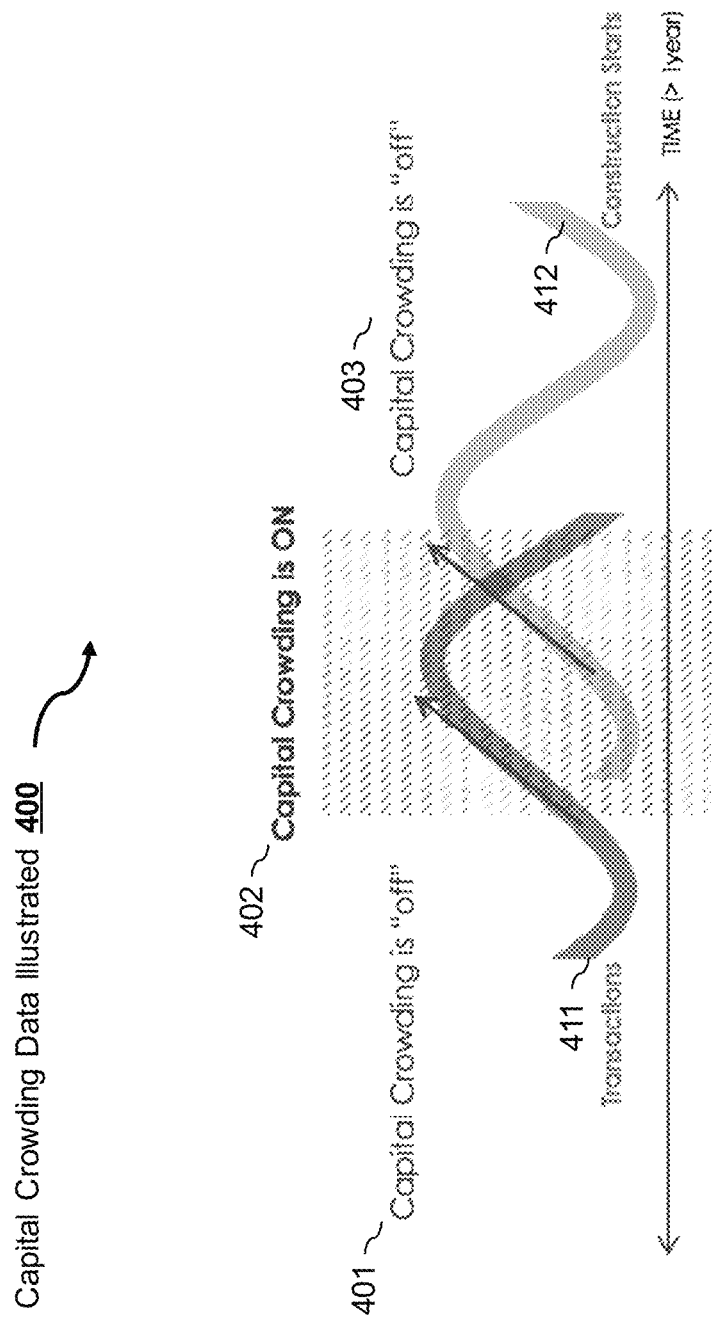
FIG. 4 provides a diagram illustrating one concept of capital crowding period, according to embodiments described herein.

FIG. 4 provides a diagram 400 illustrating one concept of capital crowding period, according to embodiments described herein. Diagram 400 shows a transaction plot 411, which illustrates the average transaction rate (e.g., number per quarter, etc.), and a construction start plot 412, which illustrates the average construction starts rate (e.g., number of construction starts per quarter, etc.), each corresponding to a specific zipcode and a property type over a period of time (e.g., greater than a year).

During a first period 401, the transaction plot shows very low activity during this time, and there is no construction starts at all. Thus the first period 401 may be considered as capital crowding "off," as a low amount of capital has flown into the zipcode during this period of time. At a period 402 when the capital crowding is "on," the transaction rate is first increasing, and then the construction rate is increasing. The general trend during this period 402 is to have capital flowing into the zipcode. During a period 403 when the capital crowding is again "off," there is no transaction activity, and the construction starts rate is declining, implying the real estate market at the zipcode is in a recession period. The capital crowding "on" and "off" is further quantitatively defined based on the volume and rate of change in transactions and construction starts in relation to FIG. 4.

Figure 5:
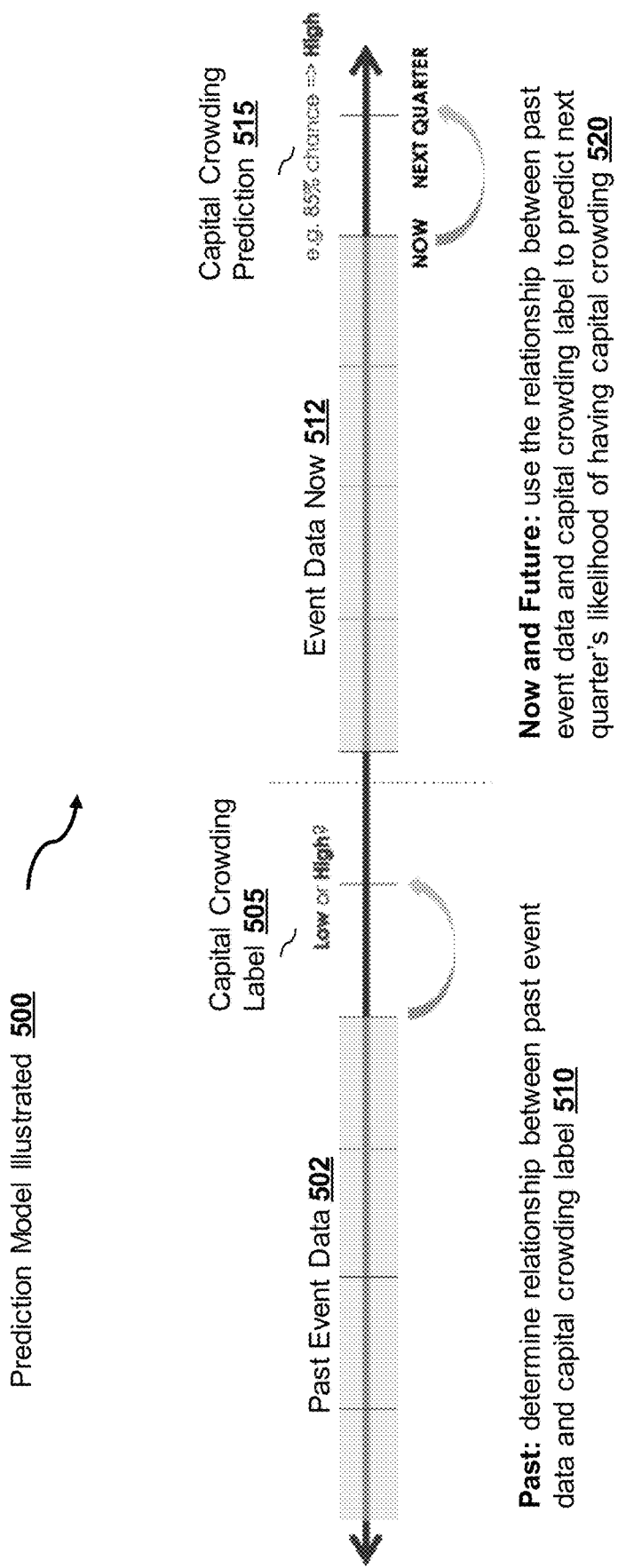
FIG. 5 provides a diagram illustrating one concept of the capital crowding prediction model in FIG. 1, according to embodiments described herein.

FIG. 5 provides a diagram 500 illustrating one concept of the capital crowding prediction model 105, according to embodiments described herein. Diagram 500 shows that past event data 502, e.g., transaction and construction data, may be used to determine a relationship between the past event and capital crowding label at a stage 510, using a capital crowding label 505 that belongs to a recent time period (e.g., the most recent quarter). For example, a logistic regression model may be used to capture the relationship.

A current event data 512 may in turn be used to predict a further capital crowding prediction 515. For example, the relationship between past event data and a capital crowding label (of the most recent quarter) may be used to predict the likelihood of capital crowding of the next quarter, as shown at stage 520. The mathematical description of stage 510 and stage 520 are further provided in relation to FIG. 6.

Figure 6:
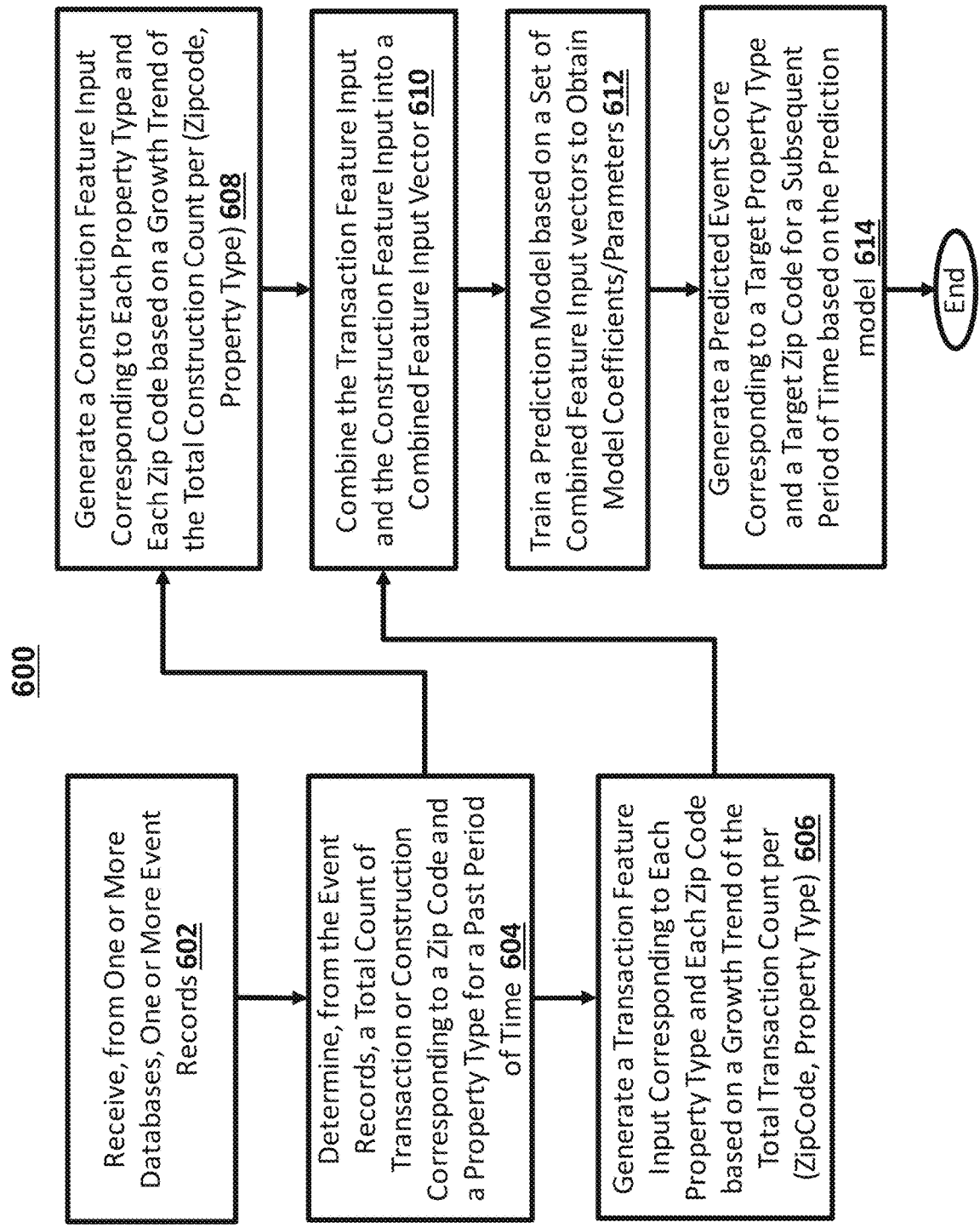
FIG. 6 is a flow diagram of an exemplary process for generating a capital crowding prediction for a target property type at target zipcode for the next quarter, according to an embodiment.

FIG. 6 is a flow diagram of an exemplary process 600 for generating a capital crowding prediction for a target property type at target zipcode for the next quarter, according to an embodiment. One or more of the processes of process 600 may be implemented, at least in part, in the form of executable code stored on non-transitory, tangible, machine-readable media that when run by one or more processors may cause the one or more processors to perform one or more of the processes. In some embodiments, process 600 may be performed by the server 130 in FIGS. 1-2. It is worth noting that additional processes, steps and/or implementations may be omitted, performed in a different sequence, or combined as desired or appropriate.

At step 602, one or more event records may be received from one or more databases. For example, the event records 102a-n may be obtained from external datasets 119a-n, in the form of raw data. In some implementations, additional data such as zipcode to MSA mapping data 303, and other data 304 such as economic data, climate data, capital markets data, etc., may also be obtained.

At step 604, a total count of transactions or construction starts may be determined corresponding to a zipcode and a property type for a past period of time. For example, ETL processing 310 may aggregate the input raw data from different datasets to count, for a number of transaction records from transaction data 301, the number of transactions that occurred in each quarter, property type and zip code, e.g., a total of 12 transactions of "residential" properties at zip code "94301" in the $1^{st}$ quarter of the year 2020. Similarly, for a number of construction projects from construction data 302, the number of construction projects that have broken ground ("construction starts") within each quarter, property type and zip code may be counted, e.g., construction has begun on a total of 3 "residential" properties at zip code "94301" and constructions has begun on a total of 2 "commercial" properties at zip code "94301" during the $1^{st}$ quarter of the year 2020.

Process 600 may proceed from step 604 to step 606 or 608, alternately, concurrently or sequentially in any order. At step 606, a transaction feature input corresponding to each property type and each zip code is generated based on a growth trend of the total transaction count per (zipcode, property type). Similarly, at step 608, a construction feature input corresponding to each property type and each zip code is generated based on a growth trend of the total construction count per (zipcode, property type) may be generated.

For example, for each of transactions and construction starts, and for each property type in each zip code for each quarter, a "positive" label of "1" is assigned if the quarter-to-quarter rate of change is in the upper 25th percentile within its MSA. If the rate of change falls in the lower 75th percentile, a "negative" label of "0" may be assigned. This results in the creation of two additional feature inputs that are binary in nature, e.g.:
transactions=[0, 0, 1, 0, 0, 0, 1, . . . ]
construction_starts=[0, 0, 1, 0, 0, 0, 1, . . . ]
Each entry in the transaction or construction binary feature input vector corresponds to a combination of (zipcode, property type, quarter).

Process 600 proceeds from both steps 606 and 608 to step 610, at which the transaction feature input and the construction feature input are combined into a feature input vector that results in a single binary input vector. For example, the feature input above "transactions" and "construction_starts" are combined into one "combined label" feature. First, each (zip code, quarter, property type) combination is labeled as "1" (positive label) if there is (i) an increasing rate of change in transactions and (ii) there is no construction start during the corresponding quarter. Thus, when there is a growing trend of transaction volume but no construction start yet during the respective quarter, the (zip code, quarter, property type) combination is labeled as positive to imply a possible start of a capital crowding period.

Second, a minimum threshold of transaction and construction start counts is applied to a positively-labeled (zip code, quarter, property type) combination. If the combination (zip code, quarter, property type) has been assigned a positive label, but actually corresponds to a total count of transactions and construction starts fewer than the threshold, then the label is changed to "0" (negative label). In this way, even if the rate of change at a particular zip code is increasing, meaning more transactions are happening but still at a rather low volume, the combination (zip code, quarter, property type) is not considered as at a capital crowding period. Otherwise, the label is kept as positive. Further details of combining the feature inputs may be discussed in relation to FIG. 8.

At step 612, a prediction model may be trained based on a set of combined feature input vectors to obtain model coefficients/parameters. For example, a statistical model may be applied to predict whether capital crowding is likely to occur in the next quarter in zip codes in the contiguous United States for which there is available data. The combined feature input vectors may be used as the capital crowding metric for each zip code, quarter/year, and property type. Raw data from external sources (publicly-available and otherwise), as well as the derived features may also be used.

For instance, a logistic regression model may be used to identify the relationship between the capital crowding metric with the remaining input data. The remaining input features may include historical data, e.g., transaction data 301, construction data 302 in the past time periods, economic data, capital markets data, climate data (per zipcode), and/or the like. The input data may be put into an input matrix of historical input data, referred to as X. Each input feature is referred to as $x_i$ and is treated as a vector in the matrix X, where $i \in [1, \ldots, N]$, N is the number of input features. For example, each input feature vector may correspond to a combined feature input generated at step 610, e.g., each $x_i$ corresponds to a specific combination of (zipcode, quarter, property type).

Finally, the probability of capital crowding is denoted by $c_i$ corresponding to an input feature vector $x_i$. Then the relationship between historical data and capital crowding within the logistic model framework is captured by the coefficients $\alpha$ and $\beta$ in the formula below:

$$P(c_i|x_i) = [\text{logit}^{-1}(\alpha+\beta^\tau x_i)^{c_i}] \cdot [1-\text{logit}^{-1}(\alpha+\beta^\tau x_i)^{1-c_i}].$$

These optimal parameter weights ($\alpha$, $\beta$) can be used as additional inputs with new, unseen input features data.

Thus, at step 614, a predicted event score corresponding to a target property type and a target zip code for a subsequent period of time may be generated based on the prediction model. For example, the aggregated input data, when run through the logit regression model, may then output a probability score that capital crowding will occur in the next quarter (e.g., $c_i=1$) for each zip code and property type. This probability is defined as:

$$P(c_i = 1 \mid x_i) = \frac{1}{1 + e^{-(\alpha+\beta^\tau x_i)}} \text{logit}^{-1}(\alpha + \beta^\tau x_i)^{c_i}.$$

In some implementations, a score threshold is used such that predicted probability scores are assigned a label of 1 (capital crowding is likely to occur in the next quarter) when the predicted probability score is greater than the threshold. Or a label of 0 is assigned (capital crowding is unlikely to occur in the next quarter) when the predicted probability score is lower than the threshold. In one example, the score threshold may be 0.43.

Figure 7:
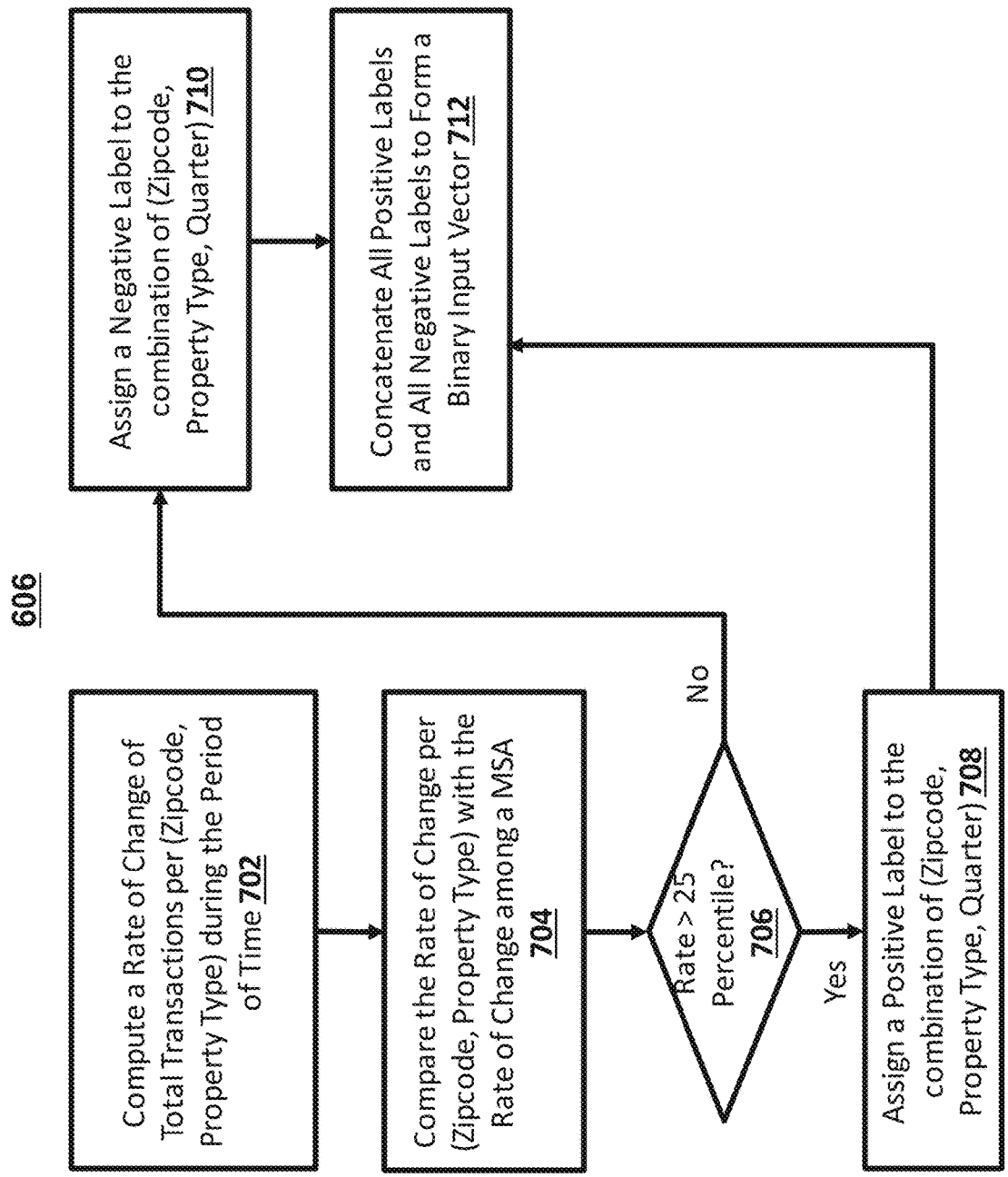
FIG. 7 is a flow diagram of the exemplary process for generating the transaction feature as shown in FIG. 6, according to an embodiment.

FIG. 7 is a flow diagram of the exemplary process 606 for generating the transaction feature as shown in FIG. 6, according to an embodiment. One or more of the steps of process 606 may be implemented, at least in part, in the form of executable code stored on non-transitory, tangible, machine-readable media that when run by one or more processors may cause the one or more processors to perform one or more of the processes. In some embodiments, process 606 may be performed by the server 130 in FIGS. 1-2. It is worth noting that additional processes, steps and/or implementations may be omitted, performed in a different sequence, or combined as desired or appropriate.

At step 702, a rate of change of the total transactions at a given zipcode and a given property type may be computed, e.g., quarter-to-quarter. For example, the system may compute the transaction rate of each quarter as the moving average of the number of transactions that happened during each quarter. If by the end of the first quarter of year 2020, the transaction rate at zipcode "94301" and property type "residential" is computed as 12/quarter, and if by the end of the second quarter of year 2020, and the transaction rate at zipcode "94301" and property type "residential" is computed as 15/quarter. Then the rate of change at the second quarter of year 2020 is increased (15−12)/12=25% from the previous quarter.

At step 704, the computed rate of change (per zipcode, property type) is then compared with the rates of change among other zipcodes within a MSA. At step 706, if the rate of change is among the 25th percentile compared with other zipcodes within the MSA, the process proceeds to step 708. At step 708, a positive label is assigned to the combination (of zipcode, property type, quarter/year).

Otherwise, at step 706, if the rate of change is not among the 25th percentile compared with other zipcodes within the MSA, the process proceeds to step 710. At step 708, a negative label is assigned to the combination (of zipcode, property type, quarter/year). At step 712, all positive labels and all negative labels are concatenated to form a binary input vector. For example, the binary input vector may correspond to a target zipcode and a target property type, but contain entries corresponding to a number of past quarters. For another example, the binary input vector may correspond to a target zipcode, but contain entries corresponding to various zipcodes in a MSA at different quarters.

Steps 702-712 are directed to generating the transaction features as shown at step 606 in FIG. 6. The construction start features may be generated in similar steps.

Figure 8:
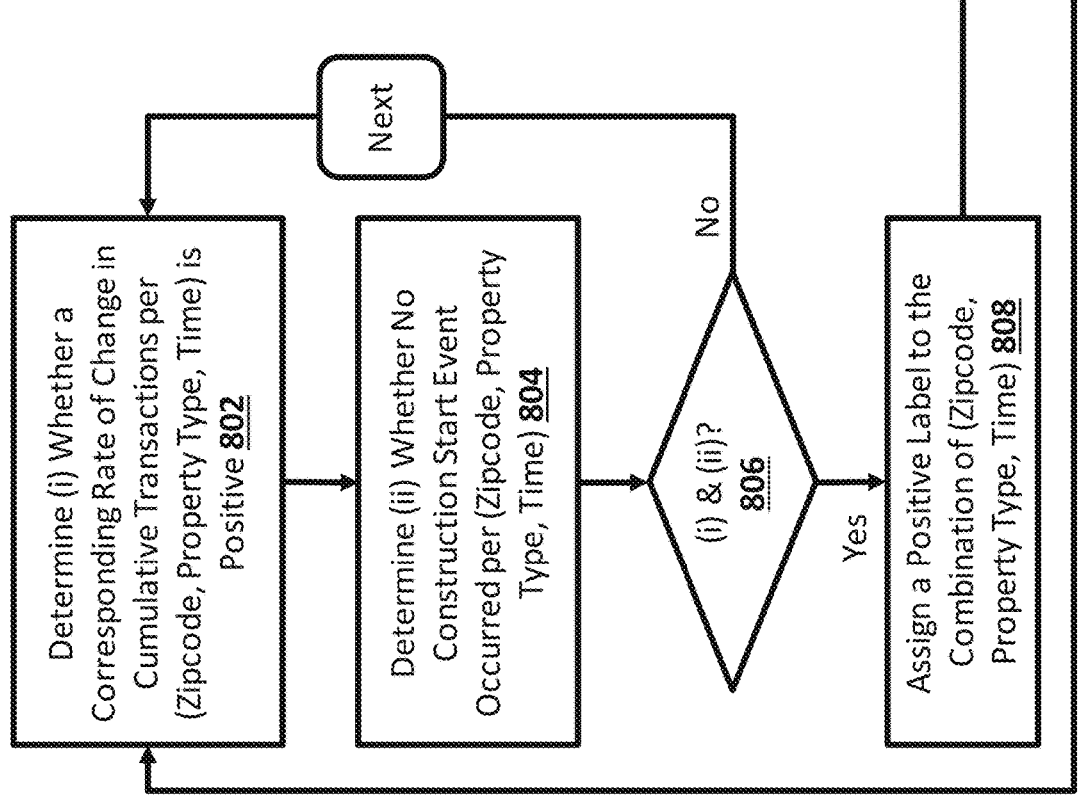
FIG. 8 is a flow diagram of the exemplary process for generating a combined feature input as shown in FIG. 6, according to an embodiment.

FIG. 8 is a flow diagram of the exemplary process 610 for generating a combined feature input as shown in FIG. 6, according to an embodiment. One or more of the steps of process 610 may be implemented, at least in part, in the form of executable code stored on non-transitory, tangible, machine-readable media that when run by one or more processors may cause the one or more processors to perform one or more of the processes. In some embodiments, process 610 may be performed by the server 130 in FIGS. 1-2. It is worth noting that additional processes, steps and/or implementations may be omitted, performed in a different sequence, or combined as desired or appropriate.

At step 802, it is determined whether a corresponding rate of change in cumulative transactions per (zipcode, property type, time) is positive. For example, the rate of change indicates whether a trend of real estate property investment at the zipcode is growing or declining. For example, if during the first quarter of year 2020, the transaction rate at zipcode "94301" and property type "residential" is computed as 12/quarter, and during the second quarter of year 2020, and the transaction rate at zipcode "94301" and property type "residential" is computed as 15/quarter, then the rate of change has increased.

At step 804, it is then determined whether no construction start event occurred per (zipcode, property type, time), e.g., based on the total count of construction starts obtained at step 604.

At step 806, when the two conditions in steps 802 and 804 are both satisfied, process 810 proceeds to step 808, at which a positive label is assigned to the combination (of zipcode, property type, quarter). Otherwise, if not both of the two conditions are satisfied, a negative label is assigned to the current combination (of zipcode, property type, quarter). Process 610 may then move on to inspect the next, e.g., another combination (of zipcode, property type, quarter) at step 802.

At step 810, process 610 may further examine whether the total count of transactions or total count of construction start events (per zipcode, property type, quarter) with the positive label is greater than a threshold. At step 806, when the total count of transactions or total count of construction start events (per zipcode, property type, time) with the positive label is greater than the threshold, the positive label may remain unchanged for the combination (of zipcode, property type, quarter). Otherwise, the positive label may be changed to a negative label for the specific combination (for zipcode, property type, quarter). Process 610 may move to process the next combination (of zipcode, property type, quarter) after steps 810 or 812, and may repeat at step 802.

In the processes described in FIGS. 6-8, a class imbalance problem may exist with the input data. Namely, there may be a very small proportion of positive labels. This can result in the resulting predictions being heavily skewed towards the majority class, which in this instance would result in a high probability of $c_i=0$. This means that most, if not all zip codes/property type combinations would be labeled as having capital crowding "not on," leading to the false impression of a low number of false negative errors. To account for the small percentage of positive labels, the input data sets may be balanced. For example, the input dataset may be balanced by automatically weighing classes inversely proportional to their frequency: $w_j=n/k \cdot n_j$ where $w_j$ is the balancing weight to the class j, n is the total number of observations, $n_j$ is the number of observations in class j, and k is the total number of classes.

In addition, a set of heuristics-based experiments may be used to identify the optimal value for the number of iterations required to ensure convergence, e.g., for the logit regression model. One example iteration upper limit could be 300. In some examples, the python package sklearn does not handle NaN values in its current implementation of the logistic regression model. Thus, the implementation may choose to drop rows that contain any NaN values, thus avoiding the concerns in imputing values for the missing data. Alternatively, other logistic regression implementations such as statsmodels may be used.

Figure 9:
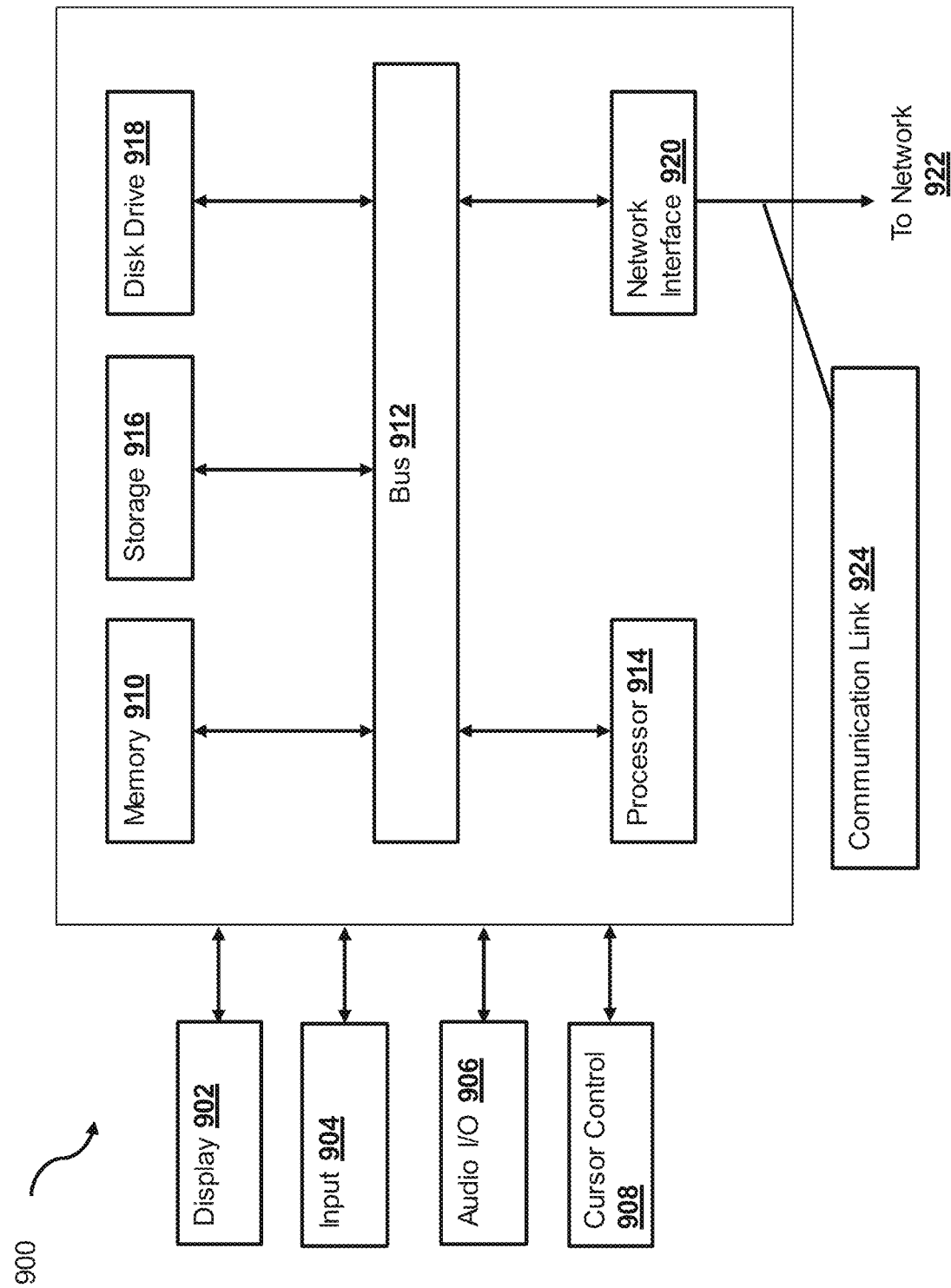
FIG. 9 is a block diagram illustrating example components of a computing device for implementing embodiments described in FIGS. 1-8, according to one embodiment.

FIG. 9 is a block diagram of a computer system 900 suitable for implementing one or more components shown in FIGS. 1-2 and performing one or more processes shown in FIGS. 6-8, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 900 in a manner as follows.

The computer system 900 includes a bus 912 or other communication mechanism for communicating information data, signals, and information between various components of the computer system 900. The components include an input/output (I/O) component 904 that processes a user (i.e., sender, recipient, service provider) action, such as selecting keys from a keypad/keyboard, selecting one or more buttons or links, etc., and sends a corresponding signal to the bus 912. The I/O component 904 may also include an output component, such as a display 902 and a cursor control 908 (such as a keyboard, keypad, mouse, etc.). The display 902 may be configured to present a login page for logging into a user account or a checkout page for purchasing an item from a merchant. An optional audio input/output component 906 may also be included to allow a user to use voice for inputting information by converting audio signals. The audio I/O component 906 may allow the user to hear audio. A transceiver or network interface 920 transmits and receives signals between the computer system 900 and other devices, such as another user device, a merchant server, or a service provider server via network 922. In one embodiment, the transmission is wireless, although other transmission mediums and methods may also be suitable. A processor 914, which can be a micro-controller, digital signal processor (DSP), or other processing component, processes these various signals, such as for display on the computer system 900 or transmission to other devices via a communication link 924. The processor 914 may also control transmission of information, such as cookies or IP addresses, to other devices.

The components of the computer system 900 also include a system memory component 910 (e.g., RAM), a static storage component 916 (e.g., ROM), and/or a disk drive 918 (e.g., a solid-state drive, a hard drive). The computer system 900 performs specific operations by the processor 914 and other components by executing one or more sequences of instructions contained in the system memory component 910.

Logic may be encoded in a computer readable medium, which may refer to any medium that participates in providing instructions to the processor 914 for execution. Such a medium may take many forms, including but not limited to, non-volatile media, volatile media, and transmission media. In various implementations, non-volatile media includes optical or magnetic disks, volatile media includes dynamic memory, such as the system memory component 910, and transmission media includes coaxial cables, copper wire, and fiber optics, including wires that comprise the bus 912. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 900. In various other embodiments of the present disclosure, a plurality of computer systems 900 coupled by the communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method for generating an on-demand message to a user device for predicting capital crowding of transaction events in a geographical area covered by a plurality of zip codes using a neural network based prediction model, the method comprising:
   receiving, via a communication interface over a network, from one or more remote databases, a plurality of event records in response to a data update demand, wherein each event record indicates one property transaction or one construction event, a respective property type and a respective zip code corresponding to the respective event record;
   transforming, by a processor, the plurality of event records into a training dataset of feature input vectors, wherein the transforming comprises:
      determining, by the processor, from the plurality of event records, a first count of transaction events and a second count of construction events corresponding to at least a specific zip code and a specific property type that occurred during a first period of time, and wherein the specific zip code corresponds to at least one of respective property types corresponding to the plurality of event records and the specific zip code corresponds to at least one of respective zip codes corresponding to the plurality of event records;
      retrieving a third count of transaction events and a fourth count of construction events corresponding to the specific zip code and the specific property type that occurred during a second period of time prior to the first period of time;
      determining by the processor a first growth trend of the first count and a second growth trend of the second count by comparing the first count with the third count and the second count with the fourth count;
      generating, for the specific property type and the specific zip code:
         a transaction feature input based on the first growth trend corresponding to the specific zip code and the specific property type, and
         a construction feature input based on the second growth trend corresponding to the specific zip code and the specific property type;
      combining the transaction feature input and the construction feature input into a combined feature input vector corresponding to the specific zip code and the specific property type;
      generating a plurality of combined feature input vectors, wherein each combined feature input vector corresponds to a specific combination of a zip code and a property type that are mentioned in the plurality of event records;
   storing, at a memory, the plurality of combined feature input vectors;
   training, by the processor, the neural network based prediction model stored at a memory, on a training dataset of the plurality of combined feature input vectors;
   generating a predicted event score indicating a probability that capital crowding corresponding to a target property type and a target zip code will occur in a subsequent fixed period of time using the trained neural network based prediction model, wherein the target property type and the target zip code are mentioned in the plurality of event records; and
   transmitting, via the communication interface and over the network, a capital crowding prediction message of the predicted event score to a user device thereby causing a display of the capital crowding prediction message on a user interface.

2. The method of claim 1, wherein the each event record from the plurality of event records includes data fields indicating:
   an event type;
   an event date;
   an event location including the zip code; and
   the property type that is transacted or constructed during an event of the respective event record.

3. The method of claim 1, wherein the determining, from the plurality of event records, the total count of events of the specific type comprises:
  determining, from the one or more plurality of event records, the total count of transactions corresponding to the specific zip code and a specific property type that occurred during a past period of time for all events that are transactions, or
  determining, from the plurality of event records, the total count of constructions corresponding to the specific zip code and the specific property type that started during the past period of time for all events that are constructions.

4. The method of claim 1, wherein the transaction feature input is generated by:
  determining, for each property-and-zip-code combination, whether a respective rate of change in total transaction number of transaction events during the first period of time is within a first percentile or a second percentile among all zip codes in the geographical area;
  assigning a positive label to a transaction event corresponding to the respective property type and the respective zip code in response to determining that the respective rate of change in total transaction number during the first period of time is within the first percentile;
  assigning a negative label to the transaction event in response to determining that the respective rate of change during the first period of time is within the second percentile; and
  concatenating all positive labels and all negative labels corresponding to the respective property type and the respective zip code to form a binary input vector.

5. The method of claim 1, wherein the construction feature input is generated by:
  determining, for each property type and each zip code, whether a respective rate of change in total construction start event number during the first period of time is within a first percentile or a second percentile among all zip codes in the geographical area;
  assigning a positive label to a construction start event corresponding to the respective property type and the respective zip code in response to determining that the respective rate of change in total construction start event number during the first period of time is within the first percentile;
  assigning a negative label to the construction start event in response to determining that the respective rate of change during the first period of time is within the second percentile; and
  concatenating all positive labels and all negative labels corresponding to the respective property type and the respective zip code to form a binary input vector.

6. The method of claim 1, wherein the combined feature input vector is generated by:
  assigning a positive label to a combination of a specific zip code, the period of time and a specific property type when (i) a corresponding rate of change in cumulative transactions is positive based on the transaction feature input and (ii) no construction start event occurred corresponding to the combination based on the construction feature input;
  determining that a respective total count of transactions or a respective total count of construction start events corresponding to the combination that has been assigned the positive label is greater than a pre-defined threshold; and
  changing the positive label to a negative label for the combination in response to determining that the respective total count of transactions or the respective total count of construction start events corresponding to the combination that has been assigned the positive label is less than the pre-defined threshold.

7. The method of claim 1, wherein the trained neural network based prediction model is a neural network based binary classifier model that generates a binary output indicating whether a capital crowding occurrence happens during the subsequent period of time.

8. The method of claim 1, wherein the predicted event score is generated by the trained neural network based prediction model given an input of one or more new event records that are not included in the plurality of event records,
  wherein the input of one or more new event records are input to the trained neural network based prediction model in a form of a feature input vector.

9. The method of claim 1, further comprising:
  balancing the plurality of event records by applying to different classes of data in the plurality of event records weights that are inversely proportional to a frequency of a corresponding class of data, wherein each class corresponds to a zip codes/property type combination.

10. A system for generating an on-demand message to a user device for predicting capital crowding of transaction events in a geographical area covered by a zip code using a neural network based prediction model, the system comprising:
  a communication interface configured to receive, over a network and from one or more databases, a plurality of event records;
  one or more processors; and
  a memory storing processor-executable instructions executed by the one or more processors to perform operations including:
  transforming the plurality of event records into a training dataset of feature input vectors, wherein the transforming comprises:
    determining, from the plurality of event records, a first count of transaction events and a second count of construction events corresponding to at least a specific zip code and a specific property type that occurred during a first period of time, wherein the specific zip code corresponds to at least one of respective property types corresponding to the plurality of event records and the specific zip code corresponds to at least one of respective zip codes corresponding to the plurality of event records;
    retrieving a third count of transaction events and a fourth count of construction events corresponding to the specific zip code and the specific property type that occurred during a second period of time prior to the first period of time;
    determining a first growth trend of the first count and a second growth trend of the second count by comparing the first count with the third count and the second count with the fourth count;
    generating, for the specific property type and the specific zip code:
      a transaction feature input based on the first growth trend corresponding to the specific zip code and the specific property type, and
      a construction feature input based on the second growth trend corresponding to the specific zip code and the specific property type;

combining the transaction feature input and the construction feature input into a combined feature input vector corresponding to the specific zip code and the specific property type;

generating a plurality of combined feature input vectors, wherein each combined feature input vector corresponds to a specific combination of a zip code and a property type that are mentioned in the plurality of event records;

storing, at the memory, the plurality of combined feature input vectors;

training the neural network based prediction model stored at a memory, on a training dataset of the plurality of combined feature input vectors;

generating a predicted event score indicating a probability that capital crowding corresponding to a target property type and a target zip code will occur in a subsequent fixed period of time using the trained neural network based prediction model, wherein the target property type and the target zip code are mentioned in the plurality of event records; and wherein the communication interface transmits over the network, a capital crowding prediction message of the predicted event score to a user device thereby causing a display of the capital crowding prediction message on a user interface.

11. The system of claim 10, wherein each event record from the plurality of event records includes data fields indicating:
an event type;
an event date;
an event location including the zip code; and
the property type that is transacted or constructed during an event of the respective event record.

12. The system of claim 10, wherein the operation of determining, from the plurality of event records, the total count of events of the specific type comprises:
determining, from the one or more plurality of event records, the total count of transactions corresponding to the specific zip code and a specific property type that occurred during a past period of time for all events that are transactions, or
determining, from the plurality of event records, the total count of constructions corresponding to the specific zip code and the specific property type that started during the past period of time for all events that are constructions.

13. The system of claim 10, wherein the transaction feature input is generated by:
determining, for each property type and each zip code, whether a respective rate of change in total transaction number of transaction events during the first period of time is within a first percentile or a second percentile among all zip codes in the geographical area;
assigning a positive label to a transaction event corresponding to the respective property type and the respective zip code in response to determining that the respective rate of change in total transaction number during the first period of time is within the first percentile;
assigning a negative label to the transaction event in response to determining that the respective rate of change during the first period of time is within the second percentile; and
concatenating all positive labels and all negative labels corresponding to the respective property type and the respective zip code to form a binary input vector.

14. The system of claim 10, wherein the construction feature input is generated by:
determining, for each property type and each zip code, whether a respective rate of change in total construction start event number during the first period of time is within a first percentile or a second percentile among all zip codes in the geographical area;
assigning a positive label to a construction start event corresponding to the respective property type and the respective zip code in response to determining that the respective rate of change in total construction start event number during the first period of time is within the first percentile;
assigning a negative label to the construction start event in response to determining that the respective rate of change during the first period of time is within the second percentile; and
concatenating all positive labels and all negative labels corresponding to the respective property type and the respective zip code to form a binary input vector.

15. The system of claim 10, wherein the combined feature input vector is generated by:
assigning a positive label to a combination of a specific zip code, the period of time and a specific property type when (i) a corresponding rate of change in cumulative transactions is positive based on the transaction feature input and (ii) no construction start event occurred corresponding to the combination based on the construction feature input;
determining that a respective total count of transactions or a respective total count of construction start events corresponding to the combination that has been assigned the positive label is greater than a pre-defined threshold; and
changing the positive label to a negative label for the combination in response to determining that the respective total count of transactions or the respective total count of construction start events corresponding to the combination that has been assigned the positive label is less than the pre-defined threshold.

16. The system of claim 10, wherein the trained neural network based prediction model is a neural network based binary classifier model that generates a binary output indicating whether a capital crowding occurrence happens during the subsequent period of time.

17. The system of claim 10, wherein the predicted event score is generated by the trained neural network based prediction model given an input of one or more new event records that are not included in the plurality of event records,
wherein the input of one or more new event records are input to the trained neural network based prediction model in a form of a feature input vector.

18. A processor-readable non-transitory medium storing a plurality of processor-executable instructions for generating an on-demand message to a user device for predicting capital crowding of transaction events in a geographical area covered by a zip code using a neural network based prediction model, the instructions being executed by one or more processors to perform operations comprising:
receiving, via a communication interface and over a network, from one or more databases, a plurality of event records;
transforming, the plurality of event records into a training dataset of feature input vectors, wherein the transforming comprises:
determining, from the plurality of event records, a first count of transaction events and a second count of construction events corresponding to at least a specific zip code and a specific property type that occurred during a first period of time, wherein the specific zip code corresponds to at least one of respective property types corresponding to the plurality of event records and the specific zip code corresponds to at least one of respective zip codes corresponding to the plurality of event records;

retrieving a third count of transaction events and a fourth count of construction events corresponding to the specific zip code and the specific property type that occurred during a second period of time prior to the first period of time;

determining a first growth trend of the first count and a second growth trend of the second count by comparing the first count with the third count and the second count with the fourth count;

generating, for the specific property type and the specific zip code:
- a transaction feature input based on the first growth trend corresponding to the specific zip code and the specific property type, and
- a construction feature input based on the second growth trend corresponding to the specific zip code and the specific property type;

combining the transaction feature input and the construction feature input into a combined feature input vector corresponding to the specific zip code and the specific property type;

generating a plurality of combined feature input vectors, wherein each combined feature input vector corresponds to a specific combination of a zip code and a property type that are mentioned in the plurality of event records;

storing the plurality of combined feature input vectors;

training, the neural network based prediction model stored at a memory, on a training dataset of the plurality of combined feature input vectors;

generating a predicted event score indicating a probability that capital crowding corresponding to a target property type and a target zip code will occur in a subsequent fixed period of time using the trained neural network based prediction model, wherein the target property type and the target zip code are mentioned in the plurality of event records; and transmitting, via the communication interface and over the network, a capital crowding prediction message of the predicted event score to a user device thereby causing a display of the capital crowding prediction message on a user interface.

* * * * *